(12) United States Patent
Carter et al.

(10) Patent No.: US 9,465,684 B1
(45) Date of Patent: Oct. 11, 2016

(54) MANAGING LOGS OF STORAGE SYSTEMS

(71) Applicant: EMC Corporation, Hopkinton, MA (US)

(72) Inventors: Stephen Carter, Fermoy (IE); Gearoid T. Griffin, Ballincollig (IE); Killian MacSweeney, White Cross (IE)

(73) Assignee: EMC Corporation, Hopkinton, MA (US)

( * ) Notice: Subject to any disclaimer, the term of this patent is extended or adjusted under 35 U.S.C. 154(b) by 165 days.

(21) Appl. No.: 13/832,331

(22) Filed: Mar. 15, 2013

(51) Int. Cl.
*G06F 11/00* (2006.01)
*G06F 11/07* (2006.01)

(52) U.S. Cl.
CPC ......... *G06F 11/0787* (2013.01); *G06F 11/079* (2013.01); *G06F 11/0766* (2013.01)

(58) Field of Classification Search
CPC ........... G06F 11/0766; G06F 11/0775; G06F 11/0781; G06F 11/079; G06F 11/0793; G06F 11/30; G06F 11/3034; G06F 11/3055; G06F 11/3058; G06F 11/3072; G06F 11/34

USPC .............. 714/6.1, 6.31, 25, 26, 33, 37, 38.1, 714/38.11, 47.1, 48, 54, 57
See application file for complete search history.

(56) References Cited

U.S. PATENT DOCUMENTS

| | | | |
|---|---|---|---|
| 6,654,915 B1* | 11/2003 | Lu | G06F 11/0748 714/43 |
| 7,721,152 B1* | 5/2010 | Joshi et al. | 714/25 |
| 2004/0059966 A1* | 3/2004 | Chan et al. | 714/48 |
| 2006/0004830 A1* | 1/2006 | Lora et al. | 707/102 |
| 2008/0155091 A1* | 6/2008 | Gokhale et al. | 709/224 |
| 2013/0227352 A1* | 8/2013 | Kumarasamy et al. | 714/47.1 |

* cited by examiner

*Primary Examiner* — Joseph D Manoskey
(74) *Attorney, Agent, or Firm* — Krishnendu Gupta; Jason A. Reyes; Deepika Bhayana

(57) ABSTRACT

A method is used in managing logs of storage systems. Log data is collected in response to receiving a request to diagnose a problem. The log data is stored on a central system. Data analysis techniques are performed automatically on the log data. A result of performing the data analysis techniques is evaluated for diagnosing the problem.

12 Claims, 7 Drawing Sheets

EMC² ONLINE SUPPORT

Welcome, Stephen;Logout;Preferences;English▼;Contact EMC

My SUPPORT▼ HOME SUPPORT BY PRODUCT DOWNLOADS  SERVICE CENTER  SEARCH🔍

Service Request Management #53392414

« Back to Service Request Management List

Attachments                                                                                              ✖

Attach File(s)   Download File(s)                                                              Refresh

| File Name | Uploaded By | File Size | Date Uploaded ▼ |
|---|---|---|---|
| CKM00100700048_SPB_2013-02-28_01-45-21_288c06_data.zip | | 23103062 | 02/28/2013 2:52 AM |
| CKM00100700048_SPA_2013-02-28_01-45-00_288c05_data.zip | | 22125460 | 02/28/2013 2:46 AM |
| | | | |

Close

Priority: A1                                  Description: *

Escalation: Never Escalated     Last Updated Date: 03/05/2013 9:27 PM

Status:  Open-Research  ▾      Next Customer Contact: 03/05/2013 11:01 PM           View

| | |
|---|---|
| EMC | TRiiAGE |

TRiiAGE  Request List  Search  Help  Contact Us

| | |
|---|---|
| Request ID | 76287 |
| Array SerialNumber | |
| Service Request | 53392414 Check SR History |
| SP A Collect | CKM00100700048_SPA_2013-02-28_01-45-00_288C05_DATA.ZIP |
| SP B Collect | CKM00100700048_SPB_2013-02-28_01-45-21_288C06_DATA.ZIP |
| Upload Date/Time | 2013-03-05 23:08:14 GMT |
| Complete Date/Time | 2013-03-05 23:15:10 GMT |
| TRiiAGE Option | 1 Week |

TRiiAGE Complete Click to Re-TRiiAGE

Download Analysis Zip Files:
Full_TRiiAGE (54530 KB)
Top_Level_TRiiAGE (12430 KB)

Web Based TRiiAGE

Array Health Check : FAILED

TRiiAGE Option : 1 Week
Refer to ARRAY ISSUES SUMMARY

| | | | |
|---|---|---|---|
| Conversion Chk for Clster | FAILED | 1 | Refer to Primus |
| DU/DL Check | FAILED | 1 | Proactive threshold reached (event code 803 ext8019) , refer to Primus |

FIG. 6

Service Request Management #53392414

« Back to Service Request Management List

Symptom Code: 944   Prod:        S/N:
Edit

Site ID:   Site Name:                               Created On: 02/27/2013 9:09 PM

| Site Information | Product | Related Objects | Environment | History | (2) |

[ Add to My SRs ] [ Accept ] [ Tasks ] [ Parts (2) ] [ Dial out ]

Security: S7M
Priority: A1
Escalation: Never Escalated
Status: Open-Research

Expand▼

Product:                                    Edit
Version/SN:
Description *                              View
Last Updated Date: 03/05/2013 11:32 PM
Next Customer Contact: 03/05/2013 11:01 PM ▲ Notes (106)

Log Notes  Dispatch  Close   Filter by Note Type: All (without Notifications) ▼        Refresh Date:       09/26/2012 4:51 PM   ▯This is an automated message from Auto-TRiiAGE▯
Added By:   Auto-TRiiAGE         The following SPcollects have been sent to Web based TRiiAGE:
                                   SPA Collect - CKM00123000561_SPA_2012-09-25_08-27-03_3190b0_data.zip
Visibility: Internal Only (Public)  SPB Collect - CKM00123000561_SPB_2012-09-25_08-27-15_319099_data.zip
Note Type:  Research              Go the following URL to view the TRiiAGE report:
                                    http://susfs.isus.emc.com/wbt//index.php?Triiage=duplicateFile&
                                    check=307df082d1382ea3c4060e14a9051441_73a444314e103f54942db61ea981ab8b Please note that this SR update does not indicate that Sr is currently
                                  being worked, it is only an indication that the logs have been
                                  processed by Auto-TRiiAGE For more information on Auto-TRiiAGE see

FIG. 7

MANAGING LOGS OF STORAGE SYSTEMS

BACKGROUND

1. Technical Field

This application relates to managing logs of storage systems.

2. Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more servers or host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data in the device. In order to facilitate sharing of the data on the device, additional software on the data storage systems may also be used.

Computers, computer networks, and other computer-based systems are becoming increasingly important as part of the infrastructure of everyday life. The proliferation of multiple interacting components leads to problems that are difficult or impossible to predict or prevent. Additionally, the need for high performance, high capacity information technology systems is driven by several factors. In many industries, critical information technology applications require outstanding levels of service. At the same time, the world is experiencing an information explosion as more and more users demand timely access to a huge and steadily growing mass of data including high quality multimedia content. The users also demand that information technology solutions protect data and perform under harsh conditions with minimal data loss and minimum data unavailability. Computing systems of all types are not only accommodating more data but are also becoming more and more interconnected, raising the amounts of data exchanged at a geometric rate.

Further, modern data storage systems ("storage systems") are put to a variety of commercial uses. For example, they are coupled with host systems to store data for purposes of product development, and large storage systems are used by financial institutions to store critical data in large databases. For many uses to which such storage systems are put, it is highly important that they be highly reliable so that critical data is not lost or unavailable. Additionally, in case of a failure in such storage systems, it is critical that cause of the failure is investigated in a timely manner for preventing further failures in such storage systems.

SUMMARY OF THE INVENTION

A method is used in managing logs of storage systems. Log data is collected in response to receiving a request to diagnose a problem. The log data is stored on a central system. Data analysis techniques are performed automatically on the log data. A result of performing the data analysis techniques is evaluated for diagnosing the problem.

BRIEF DESCRIPTION OF THE DRAWINGS

Features and advantages of the present invention will become more apparent from the following detailed description of exemplary embodiments thereof taken in conjunction with the accompanying drawings in which:

FIGS. 5-7 are representations of a graphical user interface and are an example of an embodiment of a computer system that may utilize the techniques described herein.

DETAILED DESCRIPTION OF EMBODIMENT(S)

Figure 1:
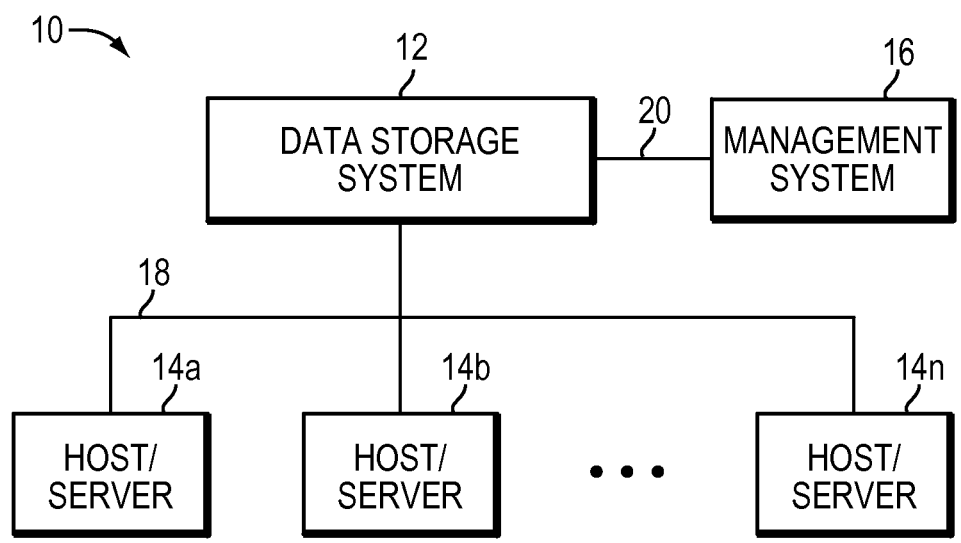
FIG. 1 is an example of an embodiment of a computer system that may utilize the techniques described herein.

Described below is a technique for use in managing logs of storage systems, which technique may be used to provide, among other things, collecting log data in response to receiving a request to diagnose a problem, where the log data is stored on a central system, automatically performing data analysis techniques on the log data, and evaluating a result of performing the data analysis techniques for diagnosing the problem.

Different tasks may be performed in connection with a data storage system. For example, software may be executed on the data storage system in connection with performing data storage administration tasks such as for data storage configuration, management, and/or monitoring. Data storage systems are becoming increasingly complex and difficult to troubleshoot. Monitoring of a data storage system includes analyzing health of the data storage system and investigating cause of a failure in the data storage system when the data storage system fails to function successfully.

Generally, when a data storage system located within a data storage environment of a customer either fails to perform an operation or panics, a data collection service in the data storage system gathers diagnostic information such as logs of the data storage system ("system logs"), logs of components of the data storage system, memory dumps, snapshots of the data storage system's memory, configuration and status information of the data storage system. Information collected by the data collection service may be provided to a storage system expert for analysis and investigating cause of a failure in the data storage system. Generally, a remote user interface such as a graphical user interface (GUI) and/or a command line interface (CLI) is used for retrieving information from the data storage system and uploading such information to a location from where the storage expert may access the information.

Generally, a large amount of log information (e.g. gigabytes of log data) is gathered and provided to a storage system expert for analysis. Conventionally, log information may be uploaded by a user of a storage system to a vendor system (e.g. using an application of a web server) via an interface (e.g., web interface) such that a storage system expert may download the log information from the vendor system to a local computer system of the storage system expert in order to analyze the log information for diagnosing a failure of the storage system. In such a conventional system, it may take a large amount of time (e.g., minutes or hours) to download log information to a local computer system for analysis as the size of the log information may range from few megabytes to several gigabytes. Further, in such a conventional system, a storage system expert need to manually execute diagnostic tools on log information downloaded to a local computer system in order to start analyzing the log information. Generally, a diagnostic tool combines diagnostic information from different logs and log data sources and performs basic analysis by executing a set of diagnostic tools. Further, in such a conventional system, log information downloaded on a local computer system is used to analyze and diagnose a specific failure of a storage system by a storage system expert and then the log information is discarded by the storage system expert. As a result, in such a conventional system, log information may be downloaded by multiple storage system experts repeatedly if the log information is analyzed multiple times by different storage system experts because each storage system expert downloads the log information locally on respective local computer system. Further, in such a conventional system, analysis performed on log data by one storage system expert for diagnosing a failure of a storage system is not accessible to other storage system experts who may be attempting to diagnose failures related to the failure diagnosed by the first storage system expert because analysis of log information is performed locally on a local computer system by the first storage system expert.

Further, in such a conventional system, it may be difficult or impossible for a storage system expert who is located geographically remote (such as India, Ireland) from a vendor system (e.g. located in United States) to download a large amount of log data from the vendor system to a local computer system. Further, in such a conventional system, the speed at which log data may be downloaded by a storage system expert from a vendor system may be slow and inefficient based upon a speed of a network connection between the vendor system and a local computer system of the storage system expert.

By contrast, in at least some implementations in accordance with the technique as described herein, use of a log analysis framework which automatically analyzes log data that customers upload to a central repository and store the analyzed data such that the analyzed data is used by storage system experts for diagnosing failures of a storage system without having to download the log data to a local computer system of a storage system expert. Thus, in at least one embodiment of the current technique, uninterrupted access to diagnostic data is provided to different storage system experts that may help in investigating the cause of a failure in a storage system. Further, in at least one data storage system implementation as described herein, log data may also be used to perform predictive analysis such as identifying trends of errors messages and failures across a large set of data storage systems used by a large number of customers.

In at least one embodiment of the current technique, a log analysis framework detects a specific problem and provides feedback to a storage system expert thereby allowing the storage system expert to focus on the specific problem. Further, the log analysis framework automates basic diagnosis and initial health check of a storage system thereby improving an amount of time it takes to diagnose a problem.

In at least one embodiment of the current technique, a data collection framework gathers information such as customer configurations, storage system configurations, and error log information. The data collection framework provides storage system experts and storage system developers with a large sample set of logs for analysis and improving storage system software based on the analysis. Further, a storage system contract with a customer may be renewed based on up-to-date information gathered by the data collection framework. Further, the data collection framework enables a storage system expert to effectively spot new failure trends across an entire install base of storage systems.

In at least some implementations in accordance with the technique as described herein, the use of the managing logs of storage systems technique can provide one or more of the following advantages: improving the amount of time it takes to diagnose a failure of a data storage system by automatically retrieving and gathering log data, improving the amount of time it takes to resolve a problem by automatically executing diagnostic tools on gathered log data, and improving system performance by using diagnostic information retrieved from a data storage system to align and tune system settings optimally.

Referring to FIG. 1, shown is an example of an embodiment of a computer system that may be used in connection with performing the techniques described herein. The computer system 10 includes one or more data storage systems 12 connected to server or host systems 14a-14n through communication medium 18. The system 10 also includes a management system 16 connected to one or more data storage systems 12 through communication medium 20. In this embodiment of the computer system 10, the management system 16, and the N servers or hosts 14a-14n may access the data storage systems 12, for example, in performing input/output (I/O) operations, data requests, and other operations. The communication medium 18 may be any one or more of a variety of networks or other type of communication connections as known to those skilled in the art. Each of the communication mediums 18 and 20 may be a network connection, bus, and/or other type of data link, such as a hardwire or other connections known in the art. For example, the communication medium 18 may be the Internet, an intranet, network or other wireless or other hardwired connection(s) by which the host systems 14a-14n may access and communicate with the data storage systems 12, and may also communicate with other components (not shown) that may be included in the computer system 10. In one embodiment, the communication medium 20 may be a LAN connection and the communication medium 18 may be an iSCSI or fibre channel connection.

Each of the host systems 14a-14n and the data storage systems 12 included in the computer system 10 may be connected to the communication medium 18 by any one of a variety of connections as may be provided and supported in accordance with the type of communication medium 18. Similarly, the management system 16 may be connected to the communication medium 20 by any one of variety of connections in accordance with the type of communication medium 20. The processors included in the host computer systems 14a-14n and management system 16 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage systems 12 are described herein in more detail, and may vary with each particular embodiment. Each of the host computers 14a-14n, the management system 16 and data storage systems may all be located at the same physical site, or, alternatively, may also be located in different physical locations. In connection with communication mediums 18 and 20, a variety of different communication protocols may be used such as SCSI, Fibre Channel, iSCSI, and the like. Some or all of the connections by which the hosts, management system, and data storage system may be connected to their respective communication medium may pass through other communication devices, such as a Connectrix or other switching equipment that may exist such as a phone line, a repeater, a multiplexer or even a satellite. In one embodiment, the hosts may communicate with the data storage systems over an iSCSI or a Fibre Channel connection and the management system may communicate with the data storage systems over a separate network connection using TCP/IP. It should be noted that although FIG. 1 illustrates communications between the hosts and data storage systems being over a first connection, and communications between the management system and the data storage systems being over a second different connection, an embodiment may also use the same connection. The particular type and number of connections may vary in accordance with particulars of each embodiment.

Each of the host computer systems may perform different types of data operations in accordance with different types of tasks. In the embodiment of FIG. 1, any one of the host computers 14a-14n may issue a data request to the data storage systems 12 to perform a data operation. For example, an application executing on one of the host computers 14a-14n may perform a read or write operation resulting in one or more data requests to the data storage systems 12.

The management system 16 may be used in connection with management of the data storage systems 12. The management system 16 may include hardware and/or software components. The management system 16 may include one or more computer processors connected to one or more I/O devices such as, for example, a display or other output device, and an input device such as, for example, a keyboard, mouse, and the like. A data storage system manager may, for example, view information about a current storage volume configuration on a display device of the management system 16, provision data storage system resources, and the like.

In another embodiment, the data storage systems 12 may include one or more data storage systems such as one or more of the data storage systems offered by EMC Corporation of Hopkinton, Mass. Each of the data storage systems may include one or more data storage devices, such as disks. One or more data storage systems may be manufactured by one or more different vendors. Each of the data storage systems included in 12 may be inter-connected (not shown). Additionally, the data storage systems may also be connected to the host systems through any one or more communication connections that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage systems 12.

It should be noted that each of the data storage systems may operate stand-alone, or may also be included as part of a storage area network (SAN) that includes, for example, other components such as other data storage systems.

Each of the data storage systems may include a plurality of disk devices or volumes. The particular data storage systems and examples as described herein for purposes of illustration should not be construed as a limitation. Other types of commercially available data storage systems, as well as processors and hardware controlling access to these particular devices, may also be included in an embodiment.

In such an embodiment in which element 12 of FIG. 1 is implemented using one or more data storage systems, each of the data storage systems may include code thereon for performing the techniques as described herein for retrieving data from the data storage system.

Servers or host systems, such as 14a-14n, provide data and access control information through channels to the storage systems, and the storage systems may also provide data to the host systems also through the channels. The host systems may not address the disk drives of the storage systems directly, but rather access to data may be provided to one or more host systems from what the host systems view as a plurality of logical devices or logical volumes (LVs). The LVs may or may not correspond to the actual disk drives. For example, one or more LVs may reside on a single physical disk drive. Data in a single storage system may be accessed by multiple hosts allowing the hosts to share the data residing therein. An LV or LUN (logical unit number) may be used to refer to the foregoing logically defined devices or volumes.

In following paragraphs, reference may be made to a particular embodiment such as, for example, an embodiment in which element 12 of FIG. 1 includes a single data storage system, multiple data storage systems, a data storage system having multiple storage processors, and the like. However, it will be appreciated by those skilled in the art that this is for purposes of illustration and should not be construed as a limitation of the techniques herein. As will be appreciated by those skilled in the art, the data storage system 12 may also include other components than as described for purposes of illustrating the techniques herein.

Figure 2:
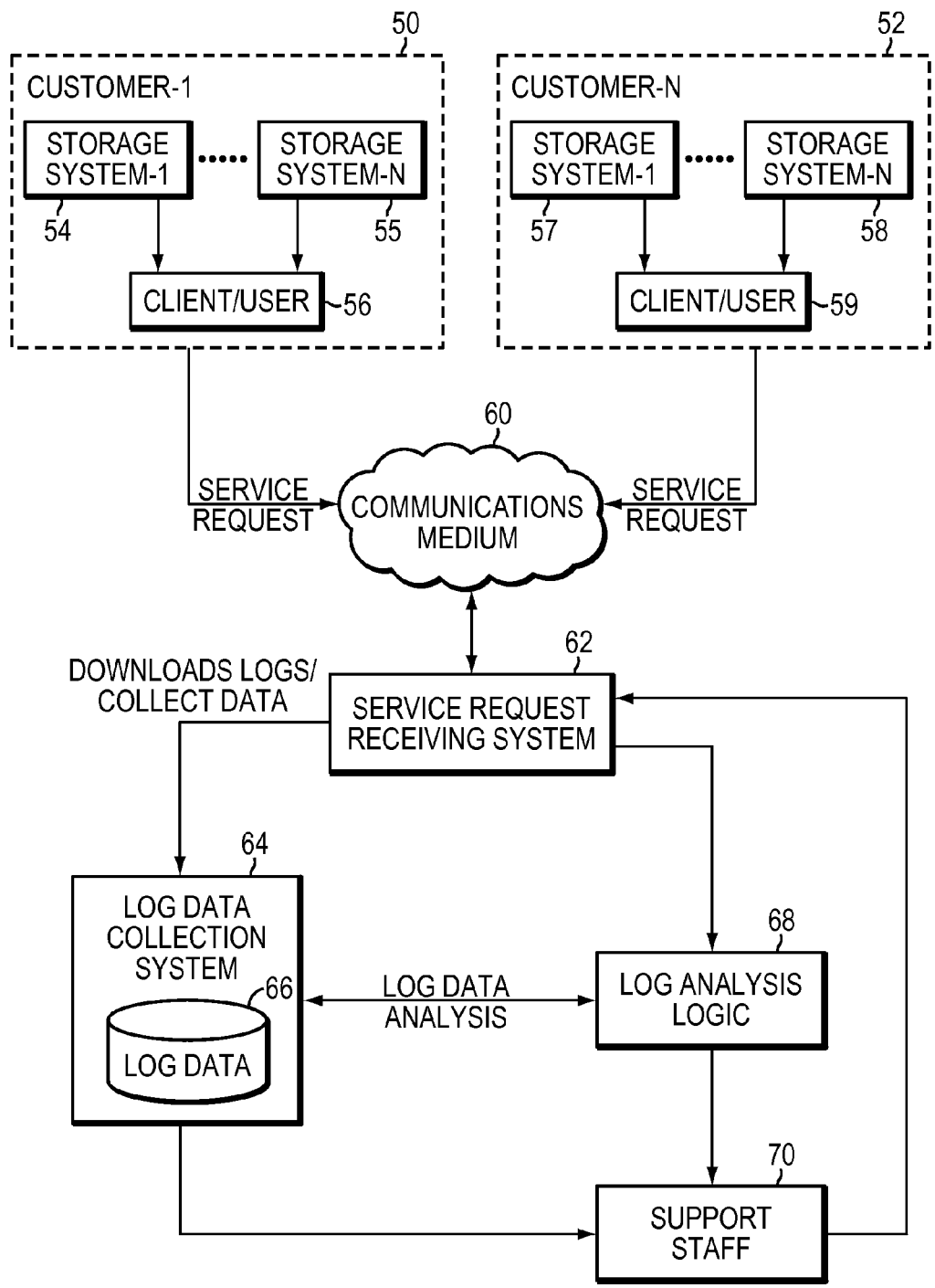
FIG. 2 is a diagram illustrating in more detail components that may be used in connection with techniques herein.

Referring to FIG. 2, shown is a detailed representation of components that may be included in an embodiment using the techniques described herein. In at least one embodiment of the current technique, a customer uploads log data of a storage system to a service request receiving system 62 (e.g. EMU® power link website) using communications medium 60. For example, in FIG. 2, customer-1 50 uses storage systems 54, 55 and a user 56 of such storage systems create a service request upon encountering a failure in any one of the storage systems 54, 55. Similarly, for example, in FIG. 2, customer-2 52 uses storage systems 57, 58 and a user 59 of such storage systems create a service request upon encountering a failure in any one of the storage systems 57, 58. A service request is created for a failure encountered on a storage system by a customer. A vendor such as EMU® of a storage system uses a service request as a mechanism for tracking failures of storage systems encountered by customers. Further, a customer uploads log data of a storage system on service request receiving system 62 and associates the log data with a service request created for a failure for which the log data is uploaded by the customer. As soon as a customer uploads log data to service request receiving system 62, an application that constantly monitors the service request receiving system 62 downloads the log data on a central server which may be accessed by multiple storage system experts.

Further, in at least one embodiment of the current technique, when log data is downloaded to a central server, the log data is provided to a log analysis logic 68 (e.g., a web based application) such that the log analysis logic 68 automatically executes a set of diagnostic tools on the log data downloaded on the central server and stores results of analysis such that the results may be accessed by multiple storage system experts. Thus, log data uploaded by a customer to service request receiving system 62 is downloaded to a central server, a set of diagnostic tools are automatically executed on downloaded log data to analyze information stored in the log data, and results of the analysis is provided to a storage system expert (e.g., support staff 70) for diagnosing a failure of a storage system. A support staff may include storage system experts such as customer service personnel, service engineering personnel, escalation engineering personnel, and storage system software developers.

Further, in at least one embodiment of the current technique, log data collection framework (e.g., log data collection system 64) may store log data uploaded by a customer into a central log data database 66 in order to apply predictive analysis techniques. Error messages may be extracted from log data 66 in order to determine trends regarding what kind of failures are encountered by customers. Thus, in at least one embodiment of the current technique, log data received from a customer is downloaded to a central server, analysis is performed on the log data, and information such as error messages are extracted from the log data in order to identify trends in failures. Log data collection system 64 may extract different types of error messages from each log provided by a customer and store the extracted error messages in a central error messages database for further analyzing the information of the central error messages database. Thus, in at least one embodiment of the current technique, log data from a customer is downloaded to a central server instead to a local computer system of a storage system expert. Further, error information from different storage systems from different customers may be gathered in a central database for further analysis.

In at least one embodiment of the current technique, each record of a central error messages database may be associated with a customer identifying information such as a customer identification number, a serial number of a storage system, a service request created by the customer. Further, by storing log data and error messages in a central location (e.g., server, database), configurations of storage systems of different customers may be analyzed thereby enabling a storage system expert to identify that a specific issue may be related to a specific configuration of a storage system. Configuration information of a storage system may be extracted from log data provided by a customer. Further, configurations of a storage system of a customer may be compared automatically with a set of best practices such that the customer may be advised to update the configurations based on the set of best practices. Further, framework such as log analysis 68 and log data collection framework 64 may be implemented using a scripting programming language. However, it should be noted that any other programming language may be used to implement such frameworks.

Figure 3:
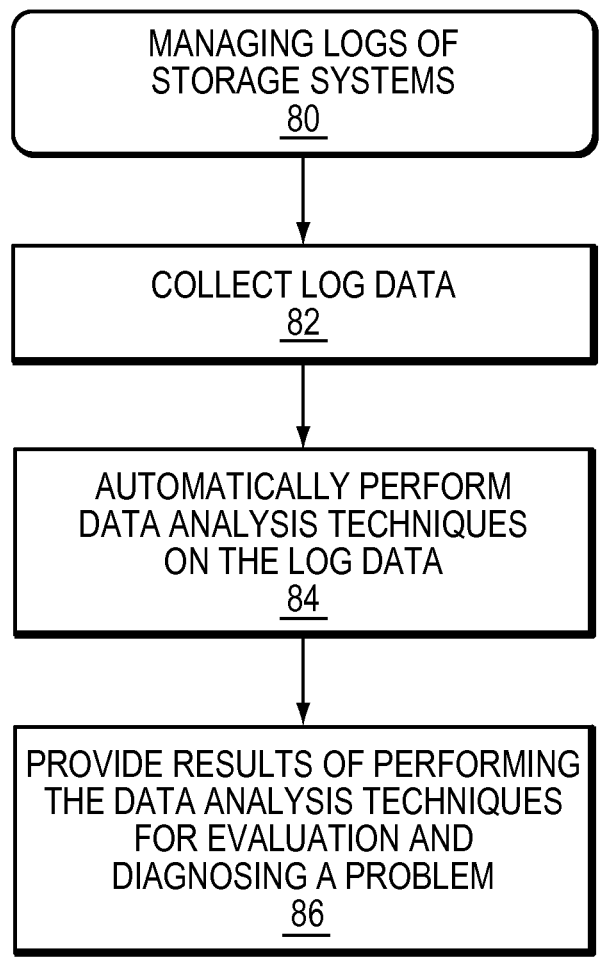
FIGS. 3-4 are flow diagrams illustrating processes that may be used in connection with techniques herein.

Referring to FIG. 3, shown is a flow diagram illustrating the method of managing logs of storage systems. With reference also to FIG. 2, log data of customers 50, 52 are managed (step 80). Log data is collected and stored on a central system upon detecting that a customer has uploaded the log data associated with a service request (step 82). A set of data analysis techniques are automatically performed on the log data stored on the central system (step 84). Results of performing the set of data analysis techniques are provided to a storage system expert for evaluation and further diagnosing a failure of a storage system (step 86).

Figure 4:
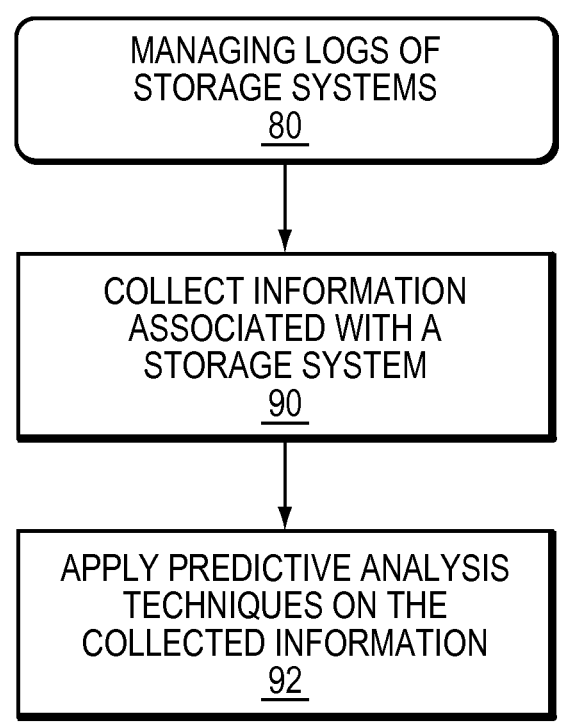

Referring to FIG. 4, shown is a flow diagram illustrating the method of managing logs of storage systems. With reference also to FIG. 2, log data of customers 50, 52 are managed (step 80). Information such as configurations, error messages associated with a storage system is gathered and stored in a central location such as a computer system or a database (step 90). The information may be extracted from log data uploaded by a customer as described above herein in FIG. 3. A set of predictive analysis techniques are applied on the information gathered from the log data (step 92).

Referring to FIG. 5, shown is an illustration of one of the many ways log data may be managed in a storage system. Shown in FIG. 5 is an example of snapshot 100 of a user interface indicating a mechanism by which a user may upload log data associated with a service request indicating a problem with a storage system of the user.

Referring to FIG. 6, shown is an illustration of one of the many ways log data may be managed in a storage system. Shown in FIG. 6 is an example of snapshot 102 of a user interface indicating analysis which is automatically performed on log data by using a set of diagnostic tools.

Referring to FIG. 7, shown is an illustration of one of the many ways log data may be managed in a storage system. Shown in FIG. 7 is an example of snapshot 104 of a user interface indicating results of analysis which is automatically performed on log data by using a set of diagnostic tools. The results of analysis may include a link to a report of the analysis.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method of managing logs of storage systems, the method comprising:
   collecting log data in response to receiving a request to diagnose a problem from a storage system user of a storage system, wherein the log data is uploaded on a service request receiving system by the storage system user;
   retrieving the log data from the service request receiving system to a central system, wherein the log data is stored on the central system, wherein information gathered from the storage system of the storage system user is uploaded to the central system configured to store a plurality of log data from a plurality of storage systems of a plurality of storage system users;
   automatically performing data analysis techniques on the log data uploaded to the central system, wherein the data analysis techniques include a set of diagnostic tools, wherein performing data analysis techniques include applying predictive analysis techniques on the plurality of log data collected from the plurality of storage systems by extracting error messages from the plurality of log data for detecting failure trends across the plurality of storage systems in use by the plurality of storage system users;

evaluating a result of performing the data analysis techniques for diagnosing the problem, wherein the result include a link to a triage report; and providing the result to a storage system expert for diagnosing the problem, wherein information gathered on the central system is accessible to a plurality of storage system experts for diagnosing problems reported by the plurality of storage system users.

2. The method of claim 1, wherein at least two storage system experts accesses the central system.

3. The method of claim 1, further comprising:

gathering error messages from the information collected from the storage system;

storing the error messages in a central error messages database; and applying the predictive analysis techniques on the error messages for identifying an error trend.

4. The method of claim 1, further comprising:

monitoring upload of the log data by a customer; and downloading the log data to the central system upon detecting the upload of the log data.

5. The method of claim 1, wherein the log data includes system logs of a storage system, configuration information and memory dumps.

6. The method of claim 1, further comprising;

applying a set of best practices to the information collected from the storage system.

7. A system of managing logs of storage systems, the system comprising a processor configured to:

collect log data in response to receiving a request to diagnose a problem from a storage system user of a storage system, wherein the log data is uploaded on a service request receiving system by the storage system user;

retrieve the log data from the service request receiving system to a central system, wherein the log data is stored on the central system, wherein information gathered from the storage system of the storage system user is uploaded to the central system configured to store a plurality of log data from a plurality of storage systems of a plurality of storage system users;

automatically perform data analysis techniques on the log data uploaded to the central system, wherein the data analysis techniques include a set of diagnostic tools, wherein performing data analysis techniques include applying predictive analysis techniques on the plurality of log data collected from the plurality of storage systems by extracting error messages from the plurality of log data for detecting failure trends across the plurality of storage systems in use by the plurality of storage system users;

evaluate a result of performing the data analysis techniques for diagnosing the problem wherein the result include a link to a triage report; and provide the result to a storage system expert for diagnosing the problem, wherein information gathered on the central system is accessible to a plurality of storage system experts for diagnosing problems reported by the plurality of storage system users.

8. The system of claim 7, wherein at least two storage system experts accesses the central system.

9. The system of claim 7, further comprising:

gather error messages from the information collected from the storage system;

store the error messages in a central error messages database; and apply the predictive analysis techniques on the error messages for identifying an error trend.

10. The system of claim 7, further comprising:

monitor upload of the log data by a customer; and download the log data to the central system upon detecting the upload of the log data.

11. The system of claim 7, wherein the log data includes system logs of a storage system, configuration information and memory dumps.

12. The system of claim 7, further comprising;

apply a set of best practices to the information collected from the storage system.

\* \* \* \* \*